United States Patent [19]

Watanabe et al.

[11] Patent Number: 5,008,224
[45] Date of Patent: Apr. 16, 1991

[54] ADSORBENT FOR PHOSPHORUS AND METHOD FOR PRODUCTION OF ADSORBENT FOR PHOSPHORUS

[75] Inventors: Eiji Watanabe, Inokoshi; Nasakazu Horio, Konan; Kenzi Suzuki, Aichi, all of Japan

[73] Assignees: Agency of Industrial Science & Technology; Ministry of International Trade & Industry, both of Tokyo, Japan

[21] Appl. No.: 373,587

[22] Filed: Jun. 30, 1989

[30] Foreign Application Priority Data

Jul. 7, 1988 [JP] Japan ................. 63-169920

[51] Int. Cl.$^5$ ............... B01J 20/12; B01J 20/16; C02F 1/28
[52] U.S. Cl. ................. 502/63; 210/683; 210/906; 502/62; 502/80; 502/401; 502/407
[58] Field of Search .............. 502/62, 63, 80, 85, 502/407

[56] References Cited

U.S. PATENT DOCUMENTS

| | | | |
|---|---|---|---|
| 3,513,640 | 5/1970 | Moliskey | 502/407 |
| 3,996,158 | 12/1976 | Cohen | 502/407 |
| 4,389,332 | 6/1983 | Ross | 252/378 R |
| 4,440,867 | 4/1984 | Sabherwal | 502/62 |

FOREIGN PATENT DOCUMENTS 2310125 9/1974 Fed. Rep. of Germany ...... 210/924

Primary Examiner—Paul E. Kanopka
Attorney, Agent, or Firm—Oblon, Spivak, McClelland, Maier & Neustadt

[57] ABSTRACT

An amorphous substance obtained by mixing volcanic ash with or without added clay and water and, if necessary, a surfactant, kneading the mixture, and shaping and firing. Additives such as camphor or naphthalene may be included prior to firing for plasticity and to form pores. The resultant mixture possesses an ability to adsorb phosphorus selectively. When this substance is placed in contact with a phosphorus-containing liquid, it removes phosphorus from the liquid.

4 Claims, 1 Drawing Sheet

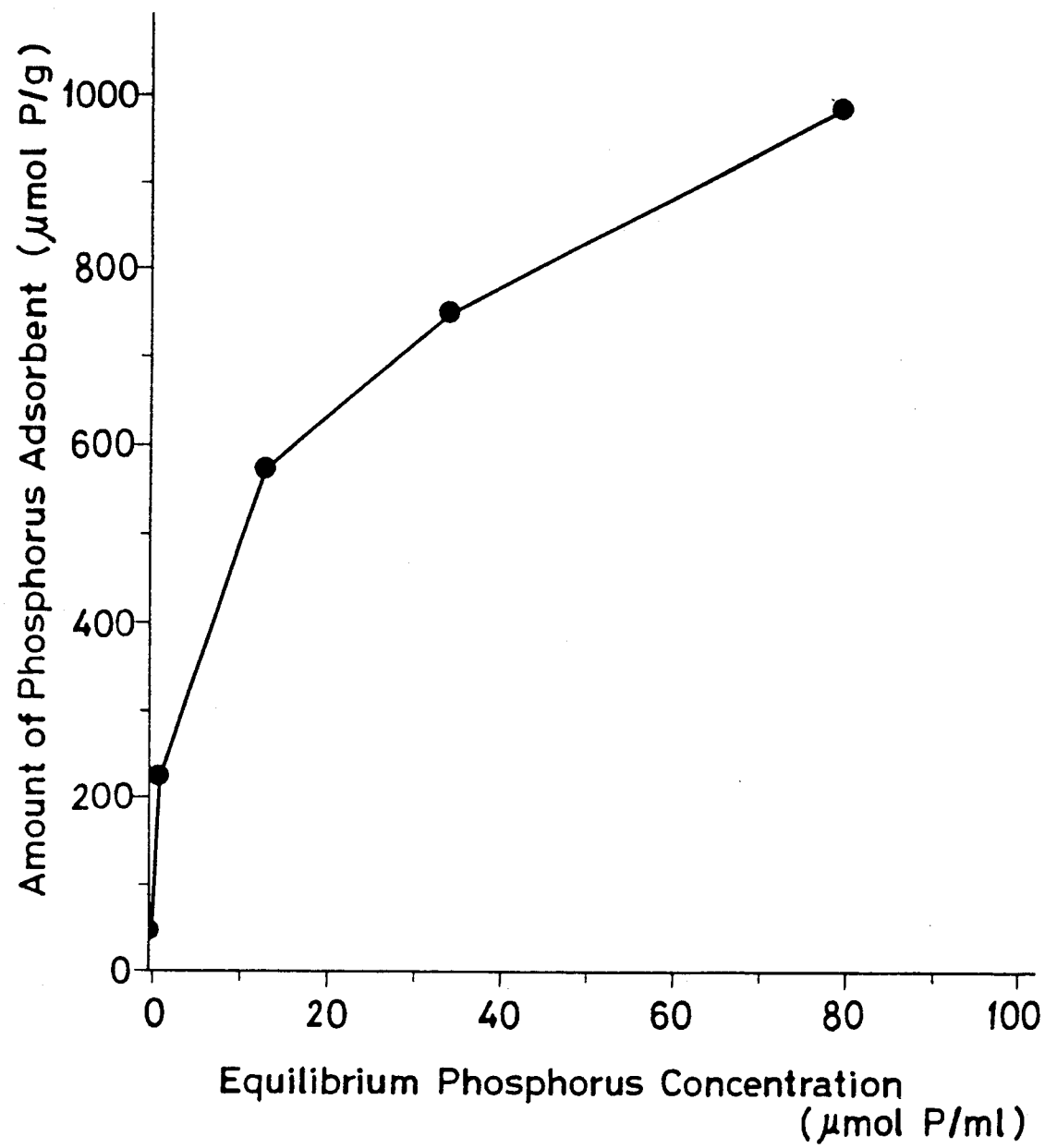

ADSORBENT FOR PHOSPHORUS AND METHOD FOR PRODUCTION OF ADSORBENT FOR PHOSPHORUS

BACKGROUND OF THE INVENTION

1. Field of the Invention

This invention relates to a novel adsorbent for phosphorus, a method for the dephosphorization of a phosphorus-containing liquid, and a method for the production of the adsorbent for phosphorus. More particularly, this invention relates to an adsorbent for phosphorus which essentially consists of a fired shaped product of volcanic ash possessing outstanding characteristics such as preferential adsorption of phosphorus, a large capacity for adsorption of phosphorus, excellent selectivity with respect to phosphorus, high durability and inexpensiveness, a method for dephosphorization by the use of the adsorbent mentioned above, and a method for the production of the adsorbent. The adsorbent is advantageously used for the removal of phosphorus from sewage, for example.

2. Prior Art Statement

In recent years, environmental pollution due to the eutrophication of rivers and lakes has become a serious problem. As countermeasures, use of phosphorus-free detergents in the home and treatment of sewage for dephosphorization have been promoted.

The removal of phosphorus from sewage has heretofore been performed mainly by secondary treatment attendant on the treatment of activated sludge using a microorganism. The known methods available for the secondary treatment include the lime process, the method using a metal salt such as an aluminum salt, and the method using an ion-exchange resin, for example (Kagaku Kogyosha: "Extra Issue of Kagaku Kogyo", Vol. 18 No. 1, pp 210-219, published on Jan. 1, 1974).

In the treatment by any of these methods, the ratio of phosphorus removed to the total phosphorus contained in the sewage falls short of 30%. Sewage still retaining the greater part of its original phosphorus content is released into rivers. These processes pose a number of problems. The lime process, for example, is a method which effects the removal of phosphorus by adding to the phosphorus-containing sewage under treatment an amount of lime large enough to adjust the pH value of the resultant mixture to about 10 thereby inducing occurrence of floc containing phosphorus and removing the floc from the sewage. This process entails the disadvantage that the neutralization of the sewage remaining after the removal of phosphorus necessitates consumption of a large amount of carbon dioxide, the treatment requires much time and labor, and the equipment for the treatment is expensive. The method relying on the use of a metal salt such as an aluminum salt entails the disadvantage that the gelled product obtained by the reaction with phosphorus requires a very difficult treatment. The method using an ion-exchange resin has very small selectivity with respect to phosphorus and normally suffers degradation in phosphorus removal capacity and efficiency in the presence of other coexisting cations or anions. Thus, the conventional techniques for the removal of phosphorus have a number of problems. A solution of these problems is urgently needed.

OBJECT AND SUMMARY OF THE INVENTION

The object of the invention is to provide an adsorbent for phosphorus which is free from the disadvantages suffered by the conventional techniques for dephosphorization as described above, which can be effectively used as packed in a simple device not only in a large treatment facility but also in a small facility, and which enjoys outstanding characteristics such as preferential adsorption of phosphorus, a large capacity for adsorption of phosphorus, high durability and inexpensiveness, a method for the adsorption of phosphorus by the use of the adsorbent, and method for the production of the adsorbent.

The inventors, after a careful study continued for the purpose of attaining the object described above, found a phosphorus adsorbent formed of the product of firing of volcanic ash to fit the object (described in the glossary of summaries of lectures delivered at the regular meeting of Chubu Soil Fertukuzer Study Society held on May 28, 1988). They have since continued the study with a view to developing a more useful phosphorus adsorbent. This invention has been perfected as the result.

To be specific, this invention is directed to a phosphorus adsorbent consisting essentially of a fired shaped product of volcanic ash, a method for the removal of phosphorus from a phosphorus-containing liquid, characterized by causing the phosphorus-containing liquid to contact the adsorbent thereby enabling the phosphorus in the liquid to be adsorbed on the phosphorus adsorbent, and a method for the production of a phosphorus adsorbent as the fired shaped product of volcanic ash.

The above and other objects and features of the invention will become more apparent from the following detailed description with reference to the accompanying drawing.

BRIEF DESCRIPTION OF THE DRAWING

The drawing is a graph showing the relation between the amount of phosphorus adsorbed and the equilibrium concentration found with the fired powder of volcanic ash in Example 3.

DETAILED DESCRIPTION OF THE PREFERRED EMBODIMENTS

Now, the present invention will be described in detail herein below. As described above, this invention is based on the novel knowledge that the powder obtained by firing volcanic ash possesses an ability to adsorb phosphorus. First, the contents of this knowledge will be explained. Volcanic ash is an amorphous substance released from during a volcanic eruption and is composed mainly of aluminosilicate. In a volcanic region, the volcanic ash occurs in the form of a deposit of ash which has settled over a wide area. This deposit of volcanic ash is very large in volume and extremely easy to collect. Any type of volcanic ash can be used for the purpose of this invention. One preferable composition of this volcanic ash is shown below (water content not included).

|  | $Al_2O_3$ | $SiO_2$ | $Fe_2O_3$ |
|---|---|---|---|
| Ordinary composition | 20–35 | 40–55 | 1–15 |
| Preferable composition | 27 | 50 | 10 |

First, the method for producing fired powder possessing an ability to adsorb phosphorus from the volcanic ash will be described.

The volcanic ash is dried in an airstream and then vulcanized. The resultant powder is desirably fired. The firing temperature is selected in the range of 100° to 900° C., preferably 300° to 900° C. If the firing temperature is lower than 100° C., the product obtained by firing the powder does not exhibit a sufficient ability to adsorb phosphorus. Though the ability of this product to adsorb phosphorus generally increases in proportion as the firing temperature rises, a firing temperature exceeding 900° C. tends to induce a sharp decline in the product's ability to adsorb phosphorus.

Though the average particle size of the powder is not strictly limited, it is preferably in the range of 5 to 20 μm, more preferably 10 to 15 μm. The smallest particle diameter practical is 0.5 μm and the largest is 60 μm.

A typical composition of what is obtained by firing the volcanic ash is shown in Table 1.

TABLE 1

| Typical composition (% by weight) of fired product of volcanic ash | | | | | |
|---|---|---|---|---|---|
| $SiO_2$ | $Al_2O_3$ | $Fe_2O_3$ | $CaO$ | $Na_2O$ | Others |
| 49.60 | 25.63 | 6.99 | 2.90 | 1.46 | 13.42 |

Though the product obtained by firing the volcanic ash has a composition variable with the particular kind of volcanic ash used as the raw material, it consists mainly of aluminosilicate. Practically this product is desired to be an amorphous substance containing at least 20% by weight of $Al_2O_3$, at least 40% by weight of $SiO_2$, and at least 1% by weight of $Fe_2O_3$. Practically it is desirable that the $Al_2O_3$ content be in the range of 20% to 35% by weight, the $SiO_2$ content in the range of 40 to 55% by weight, and the $Fe_2O_3$ content in the range of 1 to 15% by weight. The fired product has been demonstrated as by the X-ray powder diffraction pattern to exhibit amorphousness. This product at times contains small amounts of crystalline feldspar and quartz as impurities. These impurities have virtually no effect upon the product's property of adsorbing phosphorus.

The capacity for adsorption of phosphorus exhibited by the fired powder of volcanic ash is 1.2 to 2 times that of unfired volcanic ash. Where the conditions are proper, the product is capable of adsorbing not less than 1,000 μmols of phosphorus per unit weight (g) of the fired product. It is capable of dephosphorizing a phosphorus-containing liquid in any desired pH range. Since this product exhibits a high dephosphorizing ability in the pH range of 2 to 9, it can be used practically in this pH range. The product's ability to adsorb phosphorus is not appreciably affected by the electrolyte concentration of the liquid under treatment. It undergoes virtually no adverse effect particularly when the electrolyte concentration is not more than 1 M. The fired product, therefore, can be used under a wide range of conditions where the electrolyte concentration is not more than 1 M. The product's ability to adsorb phosphorus is affected very little by the presence of an ion such as chlorine ion, bicarbonate ion, nitric acid ion, or sulfuric acid ion or a cation such as sodium ion in the phosphorus-containing liquid under treatment.

For the removal of phosphorus from a solution thereof by the use of the powder of the fired volcanic ash, the powder is packed in a container and thus allowed to contact the solution. The contact by this method has the possibility of the powder passing into the solution under treatment and defiling this solution. The powder has no appreciably long service life as a dephosphorizing agent.

The inventors, therefore, have made a study with a view to obtaining a dephosphorizing agent of fired volcanic ash which is free from the drawback mentioned above. It has been consequently ascertained to them that the powder of fired volcanic ash formed under specific conditions is highly useful as a dephosphorizing agent. This invention has been perfected as the result.

This invention also relates to a method for the production of the fired shaped volcanic ash and a method for the removal of phosphorus from a phosphorus-containing liquid by the use of the dephosphorizing agent.

First, the method for the production of the fired shaped product of volcanic ash will be explained. As the first step, the volcanic ash must be adjusted to an average particle diameter in the range of 1 to 20 μm. If the average particle diameter is unduly small, the shaped product consequently obtained acquires a dense texture and therefore suffers from deficiency in ability to adsorb phosphorus. If the average particle diameter is unduly large, the shaped product abounds in brittleness and lacks practical utility.

Then, the volcanic ash thus adjusted in average particle diameter and clay are prepared in a weight ratio of 1 part of the volcanic ash to 0.6 to 1.5 part of the clay and blended with water and, if necessary, with 0.1 to 0.5% by weight, based on the total amount of the volcanic ash and the clay, of a surfactant to produce a mixture. Subsequently, the mixture is formed in a specified shape. Finally, the shaped mixture is fired to obtain the fired shaped product of volcanic ash aimed at.

The firing temperature is virtually the same as that which is used in the production of the powdered dephosphorizing agent, i.e. in the range of 100° to 900° C.

The incorporation of clay is aimed at elongating the retention of the ability to adsorb phosphorus. If the amount of the clay added is unduly small, the shaped product is deficient in hardness and liable to be finely comminuted. If this amount is unduly large, the shaped product is deficient in capacity for the adsorption of phosphorus.

The addition of the surfactant is aimed at making the composition of the unfired mixture uniform. The surfactants which are usable for the purpose of this addition include Na salt of CMC, water glass and sodium alginate.

The shaped and fired product obtained as described above has volcanic ash as its main component and also contains clay. It is an amorphous substance comprising at least 20% by weight of $Al_2O_3$, at least 40% by weight of $SiO_2$, and at least 1% by weight of $Fe_2O_3$.

In the preferred composition of the product, the $Al_2O_3$ content is in the range of 20 to 35% by weight, the $SiO_2$ content in the range of 40 to 55% by weight, and the $Fe_2O_3$ content in the range of 1 to 15% by weight.

The capacity of the fired product for the adsorption of phosphorus, though variable with the firing temperature, generally falls approximately in the range of 1,500 μmol to 2,000 μmol p/g.

The conditions for the use of the shaped and fired product of this invention are virtually the same as those for the aforementioned fired powder.

The phosphorus adsorbent of this invention which essentially consists of the shaped and fired product of volcanic ash possesses outstanding characteristics such as (1) extremely high selectivity with respect to phosphorus and sparing susceptibility to the influences of other ions normally present, (2) retention of great ability to adsorb phosphorus in a desired pH range, (3) retention of highly satisfactory ability to adsorb phosphorus even in a fairly high electrolyte concentration, (4) a large capacity for adsorption of phosphorus and high durability, (5) retention of high efficiency in the removal of phosphorus by adsorption even at normal room temperature and consequent obviation of the necessity for any special heatproof or corrosionproof material, (6) ready availability of volcanic ash as the principal raw material and low cost of production due to a relatively low firing temperature, and (7) ease of actual use and inability to defile the liquid under treatment, for example.

EXPERIMENTS AND EXAMPLES

Now, the present invention will be described more specifically below with reference to experiments and working examples. It should be noted, however, that this invention will not be restricted in any sense by these examples.

First, the experiments with the powdered product will be cited.

EXPERIMENT 1

Fired powder of volcanic ash was obtained by firing 50 g of air-dried powdered volcanic ash having an average particle diameter of 13 μm.

One-gram samples of the fired powder of volcanic ash were placed severally in 50-ml portions of an aqueous 0.01 M NaCl solution containing 10 μmols of phosphorus per ml and adjusted to various pH values in the range of 2 to 9 and kept at 25° C. to test for ability to adsorb phosphorus. The results were as shown in Table 2.

TABLE 2

| | pH | | | | |
|---|---|---|---|---|---|
| | 2 | 3 | 5 | 7 | 9 |
| Amount of phosphorus absorbed (μmol/g) | 489 | 350 | 304 | 257 | 199 |

It is clear from Table 2 that when the fired powder was used in a pH range of 2 to 9, the amount of phosphorus adsorbed increased in proportion as the pH value decreased and that the ability to adsorb phosphorus was still high even in a high pH range.

EXPERIMENT 2

One-gram samples of the fired powder of volcanic ash obtained by following the procedure of Experiment 1 were placed severally in 50-ml portions of an aqueous NaCl solution containing 10 μmols of phosphorus per ml, having various NaCl concentrations in the range of 0.0001 to 1 M, adjusted to a pH value of 4, and kept at a temperature of 25° C. to test for ability to adsorb phosphorus. The results were as shown in Table 3.

TABLE 3

| | NaCl concentration (M) | | | | |
|---|---|---|---|---|---|
| | $10^{-4}$ | $10^{-3}$ | $10^{-2}$ | $10^{-1}$ | $10^0$ |
| Amount of phosphorus absorbed (μmol/g) | 127 | 128 | 129 | 131 | 143 |

It is clear from Table 3 that the fired powder retained the ability to adsorb phosphorus substantially intact even when the NaCl concentration was varied in the range of 0.0001 to 1 M.

EXPERIMENT 3

One-gram samples of the fired powder of volcanic ash obtained by following the procedure of Experiment 1 were severally placed in 50-ml portions of an aqueous 0.01M NaCl solution having various phosphorus concentrations and adjusted to a pH value of 4 and kept at a temperature of 25° C. to test for ability to adsorb phosphorus. The results were as shown in the drawing. It is clear from the diagram that the fired powder gained in adsorbed amount of phosphorus in proportion as the phosphorus content increased in the liquid under treatment and acquired a capacity for adsorption exceeding 1,000 μmol/g.

EXPERIMENT 4

One-gram samples of the fired powder of volcanic ash obtained by following the procedure of Experiment 1 were severally placed in 50-ml portions of an aqueous solution containing 0.01 M of coexisting ions, 0.01 M of NaCl, and 10 μmols of phosphorus per ml and adjusted to a pH value of 4 and kept at a temperature of 25° C. to test for ability to adsorb phosphorus. The results were as shown in Table 4.

TABLE 4

| | Coexisting ions | | | |
|---|---|---|---|---|
| | $Cl^-$ | $HCO_3^-$ | $NO_3^-$ | $SO_4^{2-}$ |
| Amount of phosphorus absorbed (μmol/g) | 159.2 | 157.3 | 151.1 | 153.4 |

It is clear from Table 4 that the fired powder retained the ability to adsorb phosphorus substantially intact even when normally occurring anions and cations were coexistent in a high concentration (0.01 M).

EXPERIMENT 5

The same air-dried powdered volcanic ash 13 μm in average diameter as used in Experiment 1 was fired at successively higher temperatures and examined for change of state. Consequently, it was found that decomposition of the allophane-like substance occurred at temperatures up to about 200° C., a loss of weight was recognized at higher temperatures up to the neighborhood of 500° C., and formation of meta-kaoline and fine mullite was recognized at temperatures above around 950° C. The occurrence of all of these substances was confirmed by differential thermal analysis and thermogravimetric analysis.

It was confirmed with an X-ray diffraction chart that the fired powder of volcanic ash continued to exhibit amorphousness at temperatures up to the neighborhood of 900° C. and ceased to show any amorphousness and that crystallization began newly at temperatures exceeding 900° C. These results indicate that the fired powder at temperatures in the range of 100° to 900° C. was an amorphous substance produced by the decomposition of the allophanelike substance.

EXPERIMENT 6

Aliquots of the same air-dried powdered volcanic ash 13 μm in average diameter as used in Experiment 1 were severally fired at 300° C., 600° C., and 1,000° C. to obtain fired powders.

Then, one gram of each of the fired powders was placed in 50 ml of an aqueous 0.01 M NaCl solution containing 10 μmol of phosphorus per ml and adjusted to a pH value of 4 and kept at a temperature of 25° C. to test for amount of phosphorus adsorbed. The results were as shown in Table 5.

TABLE 5

| | Unfired volcanic ash | Firing temperature (°C.) | | |
|---|---|---|---|---|
| | | 300 | 600 | 1,000 |
| Amount of phosphorus adsorbed (μmol/g) | 200 | 350 | 370 | 7 |

It is clear from Table 5 that the fired powder showed a considerable improvement in the ability to adsorb phosphorus as compared with the unfired volcanic ash and that the firing temperature showed a sharp decline in the ability to adsorb phosphorus when this firing temperature exceeded 900° C.

EXAMPLE 1

Volcanic ash having a water content of 5% by weight and consisting essentially of 27% by weight of $Al_2O_3$, 50% by weight of $SiO_2$, 10% by weight of $Fe_2O_3$, 3% by weight of CaO and 1% by weight of $Na_2O$ was comminuted to obtain powder having an average particle diameter of 13 μm. Powdered clay (not more than 70 mesh, 14 μm in average particle diameter) consisting of 35% by weight of $Al_2O_3$, 50% by weight of $SiO_2$, 3% by weight of $Fe_2O_3$, 0.5% by weight of CaO and 0.7% by weight of $Na_2O$ was added to the powdered volcanic ash in a weight ratio of 1 part of the powdered volcanic ash to 1 part of the powdered clay to obtain a homogeneous mixture. This mixture was blended with about 10% of water based on the amount of the mixture, and kneaded to obtain a mixture having plasticity. The resultant mixture was introduced into a mold of gypsum having a cylindrical recess 4 cm in diameter and 0.5 cm in depth to obtain a shaped product. In order for the shaped product to have an increased specific surface area, about 100 bores 0.1 mm to 0.5 mm in diameter were formed in the shaped product. The shaped product was then dried in an airstream and fired at a temperature of 600° C. for 30 minutes. The fired product assumed a cylinder contracted by the firing treatment to weigh 6.00 g and have a diameter of 3.7 cm and a height of 0.5 cm.

The fired product was set in place within a filter to test for ability to adsorb phosphorus. A solution containing 1 μmol of phosphorus per ml (pH 4, electrolyte (NaCl) concentration 0.01 M) was passed through the fired product within the filter. As a result, the filtered solution contained no phosphorus.

EXAMPLE 2

A mixture having plasticity was obtained by following the procedure in Example 1. Camphor was added to the mixture so that the content of the camphor was about 30%, and the resultant mixture was kneaded to obtain a homogeneous mixture. This mixture was shaped and fired in the same manner as in Example 1. During the firing treatment at a temperature of about 200° C., the camphor was evaporated. For this reason, the fired product obtained had its interior formed with a great number of pores communicating with one another.

The fired product was set in place within a filter in the same manner as in Example 1 to test for ability to adsorb phosphorus. The filtered solution contained no phosphorus.

Tests were conducted with the content of camphor varied in the range of 10% to 50%. The results obtained were substantially the same.

EXAMPLE 3

The same procedure as in Example 2 was taken except that naphthalene was used in place of camphor. The result obtained was substantially the same as in Example 2.

What is claimed is:

1. A phosphorus adsorbent consisting essentially of a fired product obtained by comminuting volcanic ash, adding 0.6 to 1.5 part by weight, based on part by weight of the comminuted volcanic ash, of clay and water to the comminuted volcanic ash to obtain a mixture, and firing the mixture at a temperature in the range of 100° to 900° C.;

said fired product consisting substantially of aluminosilicate;

said aluminosilicate consisting essentially of at least 20% by weight of $Al_2O_3$, at least 40% by weight of $SiO_2$ and at least 1% by weight of $Fe_2O_3$.

2. A phosphorus adsorbent according to claim 1, wherein said aluminosilicate consists essentially of 20 to 35% by weight of $Al_2O_3$, 40 to 55% by weight of $SiO_2$ and 1 to 15% by weight of $Fe_2O_3$.

3. A method for the production of a phosphorus adsorbent consisting essentially of aluminosilicate which consists essentially of at least 20% by weight of $Al_2O_3$, at least 40% by weight of $SiO_2$ and at least 1% by weight of $Fe_2O_3$, said method comprising the steps of:

comminuting volcanic ash;

adding 0.6 to 1.5 part by weight, based on part by weight of the comminuted volcanic ash, of clay and water to the comminuted volcanic ash to obtain a mixture;

shaping said mixture; and firing the shaped mixture at a temperature in the range of 100° to 900° C.

4. A method according to claim 3, wherein said volcanic ash consists substantially of aluminosilicate which consists essentially of 20 to 35% by weight of $Al_2O_3$, 40 to 55% by weight of $SiO_2$ and 1 to 15% by weight of $Fe_2O_3$.

* * * * *

UNITED STATES PATENT AND TRADEMARK OFFICE
CERTIFICATE OF CORRECTION

PATENT NO. : 5,008,224
DATED : April 16, 1991
INVENTOR(S) : Eiji Watanabe et al.

It is certified that error appears in the above-identified patent and that said Letters Patent is hereby corrected as shown below:

ON THE TITLE PAGE: Item [75]

The second inventor's name is incorrect, should be,

--Masakazu Horio--, and the assignee is incorrect, should be,

-- Agency of Industrial Science & Technology, Ministry of

International Trade & Industry, Tokyo, Japan--.

Signed and Sealed this

Twenty-ninth Day of September, 1992

Attest:

DOUGLAS B. COMER

*Attesting Officer*     *Acting Commissioner of Patents and Trademarks*